(12) United States Patent
Horesh et al.

(10) Patent No.: US 11,943,342 B1
(45) Date of Patent: Mar. 26, 2024

(54) PRIVATE CATEGORIZATION USING SHARED KEYS

(71) Applicant: Intuit Inc., Mountain View, CA (US)

(72) Inventors: Yair Horesh, Kfar Sava (IL); Yehezkel Shraga Resheff, Jerusalem (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/103,475

(22) Filed: Jan. 30, 2023

(51) Int. Cl.
*H04L 9/08* (2006.01)
*H04L 9/00* (2022.01)

(52) U.S. Cl.
CPC ............ *H04L 9/0838* (2013.01); *H04L 9/008* (2013.01); *H04L 9/0822* (2013.01)

(58) Field of Classification Search
CPC ...... H04L 9/0838; H04L 9/008; H04L 9/0822
See application file for complete search history.

(56) References Cited

U.S. PATENT DOCUMENTS

| | | | | |
|---|---|---|---|---|
| 11,610,207 | B1* | 3/2023 | Chowdhury | G06Q 20/4016 |
| 2015/0039912 | A1* | 2/2015 | Payton | H04L 9/14 |
| | | | | 713/193 |
| 2022/0414661 | A1* | 12/2022 | Hassanzadeh | G06N 3/04 |
| 2023/0025754 | A1* | 1/2023 | Hassanzadeh | H04L 9/008 |

OTHER PUBLICATIONS

Chen, H. et al., "Logistic Regression over Encrypted Data from Fully Homomorphic Encryption", BMC Medical Genomics, vol. 11 (Suppl 4) Art. 81; Oct. 11, 2018 (10 pages). https://bmcmedgenomics.biomedcentral.com/articles/10.1186/s12920-018-0397-z.

\* cited by examiner

*Primary Examiner* — Daniel B Potratz
(74) *Attorney, Agent, or Firm* — Lathrop GPM LLP

(57) ABSTRACT

A method implements private categorization using shared keys. The method includes selecting an encryption key, encrypting a transaction vector, generated from a transaction record, with the encryption key to generate an encrypted transaction vector, and receiving an encrypted category vector generated by a classifier model, corresponding to the encryption key, from the encrypted transaction vector. The method further includes decrypting a category from the encrypted category vector with a decryption key corresponding to the encryption key and presenting the category.

20 Claims, 6 Drawing Sheets

PRIVATE CATEGORIZATION USING SHARED KEYS

BACKGROUND

Computer implemented models, including machine learning models, are becoming increasingly complex to solve increasingly sophisticated problems. In order to train machine learning models, data from multiple users may be used, but using data from multiple users increases the risk that private information may be exposed. A challenge is to preserve user privacy while combining data from multiple users to train machine learning models.

SUMMARY

In general, in one or more aspects, the disclosure relates to a method that implements private categorization using shared keys. The method includes selecting an encryption key, encrypting a transaction vector, generated from a transaction record, with the encryption key to generate an encrypted transaction vector, and receiving an encrypted category vector generated by a classifier model, corresponding to the encryption key, from the encrypted transaction vector. The method further includes decrypting a category from the encrypted category vector with a decryption key corresponding to the encryption key and presenting the category.

In general, in one or more aspects, the disclosure relates to a system including at least one processor, at least one memory, an encryption controller configured to generate an encrypted transaction vector, and an application stored in the at least one memory and executing on the at least one processor. The application is configured for selecting an encryption key, encrypting a transaction vector, generated from a transaction record, with the encryption key to generate an encrypted transaction vector, and receiving an encrypted category vector generated by a classifier model, corresponding to the encryption key, from the encrypted transaction vector. The application is further configured for decrypting a category from the encrypted category vector with a decryption key corresponding to the encryption key and presenting the category.

In general, in one or more aspects, the disclosure relates to a computer program product including non-transitory computer-readable program code that, when executed by a computer processor of a computing system, causes the computing system to perform operations. The operations include selecting an encryption key, encrypting a transaction vector, generated from a transaction record, with the encryption key to generate an encrypted transaction vector, and receiving an encrypted category vector generated by a classifier model, corresponding to the encryption key, from the encrypted transaction vector. The operations further include decrypting a category from the encrypted category vector with a decryption key corresponding to the encryption key and presenting the category.

Other aspects of the invention will be apparent from the following description and the appended claims.

DETAILED DESCRIPTION

In general, embodiments perform private categorization using shared keys to preserve user privacy while combining data from multiple users to train machine learning models. In one embodiment, a group of multiple users utilize a shared key to encrypt information using fully homomorphic encryption. The encrypted information from the group of multiple users may then be pooled and used to train machine learning models for the group. The processes train the machine learning models using the homomorphically encrypted information and do not have access to the unencrypted information. User privacy is preserved by preventing access to the unencrypted information for the processes training the machine learning models. The machine learning models are trained using the homomorphically encrypted information.

In one embodiment, groups of users are identified by clustering aggregated report information from the different users. The users may periodically generate aggregated reports that includes statistical information about transaction records. The use of statistical information, instead of direct transaction information, prevents the training systems and machine learning models disseminating explicit transaction data. The statistical information from the aggregated reports may be processed by clustering algorithms to identify groups of similar users. A group of similar users may then share an encryption key that is used to encrypt the data from the group of users and train a machine learning model.

In one example, Professor X and Lex Luthor each need to categorize their transactions. Professor X and Lex Luthor run in different circles and do not know each other but get clustered together based on aggregated reports of their transaction records. Professor X and Lex Luthor both opt in to using more accurate models trained with group data and receive shared group encryption keys. The group keys are used to encrypt historical data from Professor X and Lex Luthor, which is then used to train a group model for predicting categories for transaction records. After the models are trained, Professor X and Lex Luthor independently log into the system to categorize transactions using the group model.

The figures of the disclosure show diagrams of embodiments that are in accordance with the disclosure. The embodiments of the figures may be combined and may include or be included within the features and embodiments described in the other figures of the application. The features and elements of the figures are, individually and as a combination, improvements to the technology of computer implemented models and encryption. The various elements, systems, components, and steps shown in the figures may be omitted, repeated, combined, and/or altered as shown from the figures. Accordingly, the scope of the present disclosure should not be considered limited to the specific arrangements shown in the figures.

Figure 1A:
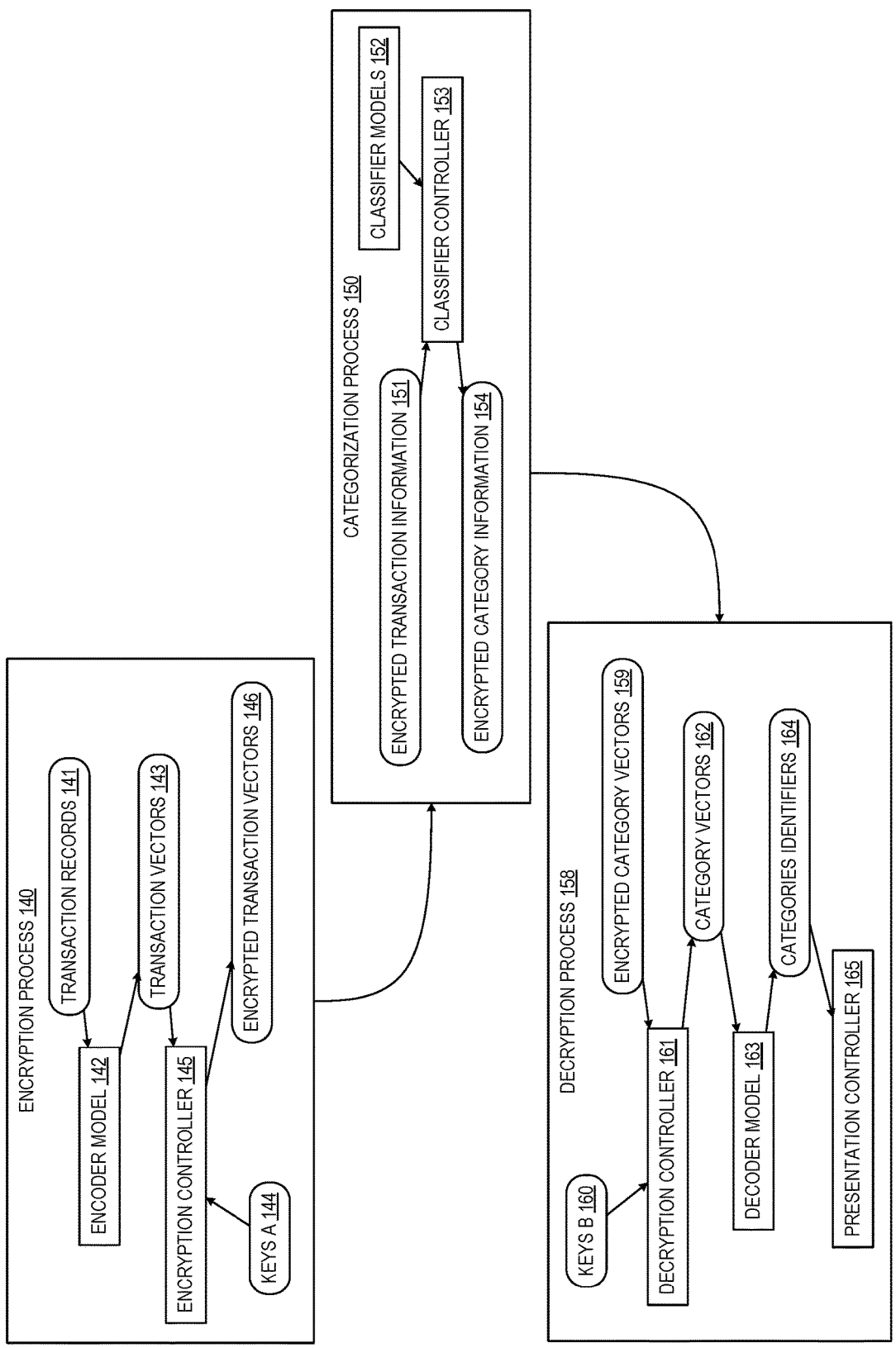
FIG. 1A, FIG. 1B, and FIG. 1C show diagrams of systems in accordance with disclosed embodiments.
Figure 1B:
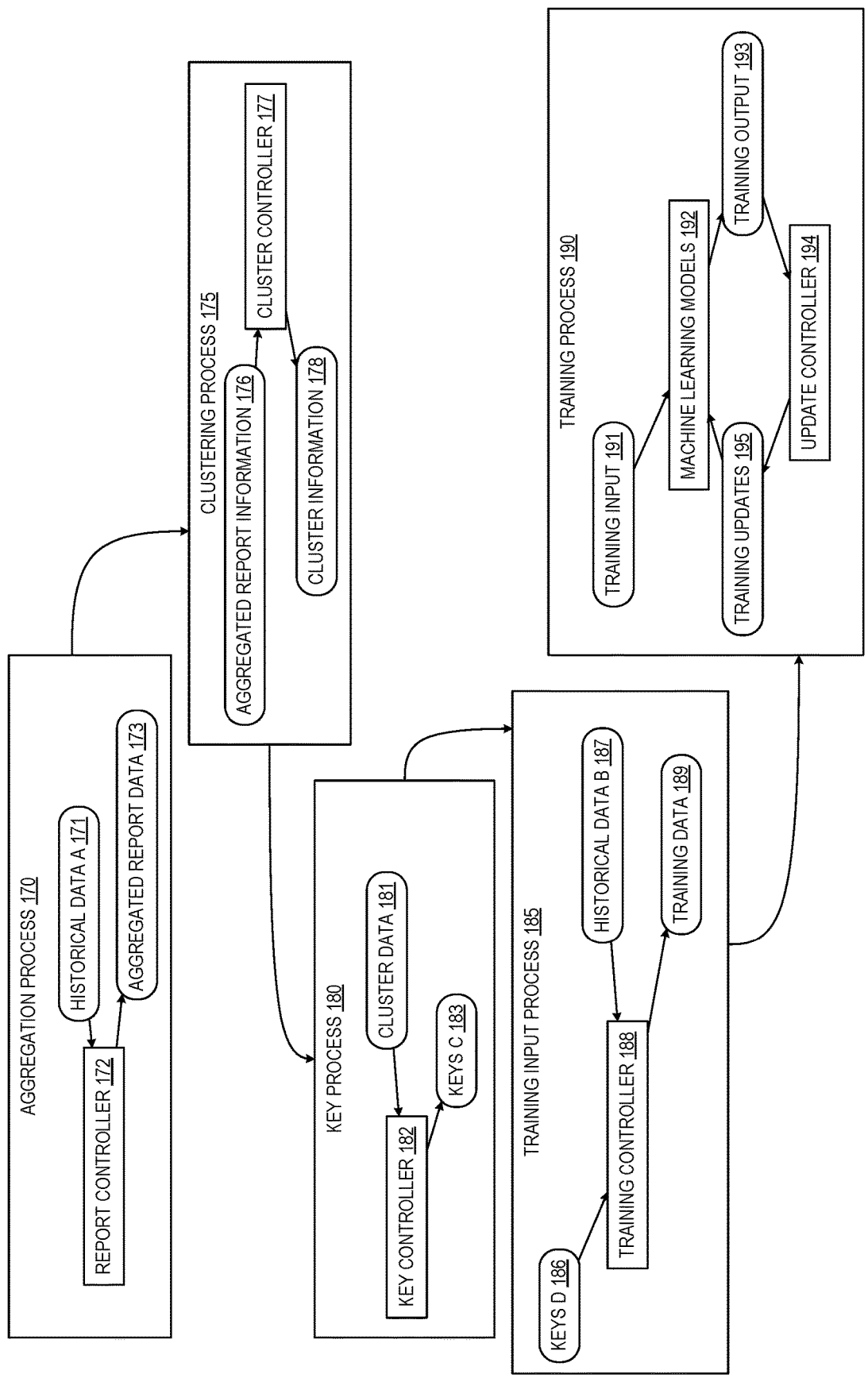
Figure 1C:
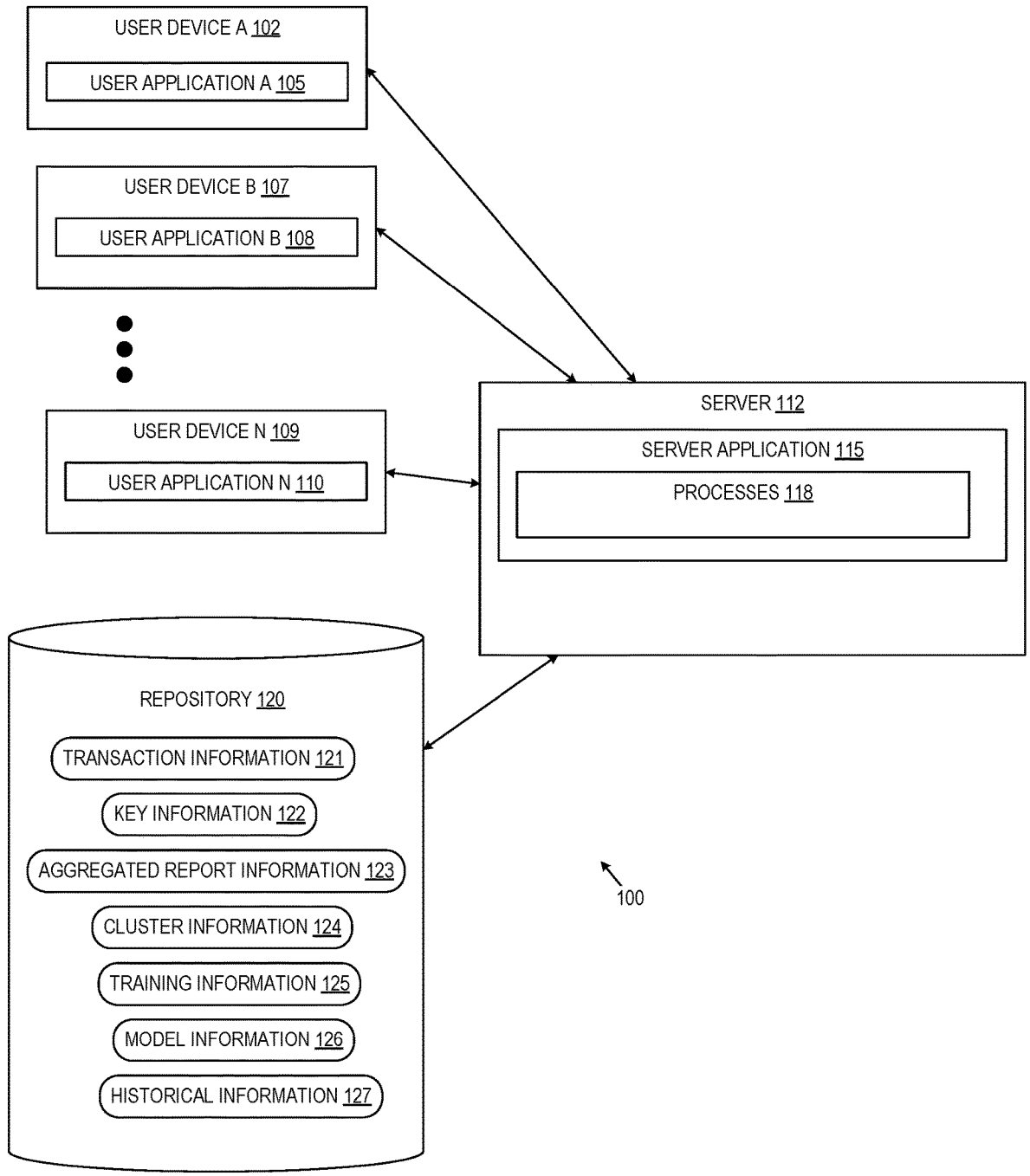

FIGS. 1A, 1B, and 1C show processes and systems that operate to perform private categorization using shared keys. The processes (140), (150), (158) of FIG. 1A and the processes (170), (175), (180), (185), and (190) of FIG. 1B may operate on the user devices A (102) and B (107) through N (109) and the server (112) of FIG. 1C.

In one embodiment, the processes (140) and (158) of FIG. 1A and the processes (170), (180), and (185) may operate on the user devices A (102) and B (107) through N (109) of FIG. 1C while the process (150) of FIG. 1A and the processes (175) and (190) operate on the server (112) of FIG. 1C. Dividing the work of the processes between systems in this manner may reduce the amount of compute resources utilized by the server (112). For example, the server (112) of FIG. 1C may host an application with a REST interface used by the applications executing on the user devices A (102) and B (107) through N (109) of FIG. 1C In one embodiment, the processes (140), (150), (158) of FIG. 1A and the processes (170), (175), (180), (185), and (190) may operate on the server (112). The server (112) may then provide access to information generated by the processes to the user devices A (102) and B (107) through N (109). For example, the server (112) may host a website that operates the processes in response to user accesses to the website.

Turning to FIG. 1A, the encryption process (140), the categorization process (150), and the decryption process (158) may operate to perform private categorization using shared keys. The encryption process (140), the categorization process (150), and the decryption process (158) may execute on one or more of the user devices A (102) and B (107) through N (109) and the server (112).

The encryption process (140) is a collection of programs and components with instructions to process the transaction records (141) to generate the encrypted transaction vectors (146). The encryption process (140) uses the encoder model (142) and the encryption controller (145).

The transaction records (141) are records of transactions and may be a subset of the transaction information (121) of FIG. 1C. The transaction records (141) are inputs to the encoder model (142). In one embodiment, a transaction record may include a date (year, month, day, hour, minute, second, etc.), one or more numeric fields, one or more text fields, etc. For example, the numeric fields may include a floating-point value that identifies an amount for the transaction and an integer value that identifies the transaction. The text fields may include payee information, payor information, a description of the transaction, etc. The following JavaScript object notation (JSON) text provides an example of transaction data.
{
  "ID": "1234",
  "payor": "Superman",
  "payee": "Dark Knight Industries",
  "date": "Dec. 28, 2022",
  "amount": "199.99",
  "description": "superhero costume dry cleaning"
}

The encoder model (142) is a collection of programs with instructions that may operate as part of the encryption process (140). The encoder model (142) processes the transaction records (141) to generate the transaction vectors (143). The encoder model (142) may apply mappings and transformations to data from the transaction records (141) to generate the transaction vectors (143). In one embodiment, the encoder model (142) may include a machine learning model that calculates the transaction vectors (143) from the transaction records (141). The machine learning model may include a neural network, an autoencoder, a transformer network, a fully connected network, etc.

The transaction vectors (143) are vectors that describe the transaction records (141). The transaction vectors (143) may include features extracted from the transaction records (141) by the encoder model (142). In one embodiment, a transaction vector may include multiple floating-point values that represent information from the transaction records (141). A transaction vector may include data from one or more of the transaction records (141). The transaction vectors (143) are input to the encryption controller (145).

The keys A (144) are cryptographic keys that are used to encode (i.e., encrypt) the transaction vectors (143). The keys A (144) may include public keys (used for encoding) that are paired with private keys (used for decoding).

The encryption controller (145) is a collection of programs with instructions that may operate as part of the encryption process (140). The encryption controller (145) processes the transaction vectors (143) with the keys A (144) to generate the encrypted transaction vectors (146). In one embodiment, the encryption controller (145) uses fully homomorphic encryption to generate the transaction vectors (143).

The encrypted transaction vectors (146) are vectors encrypted using the keys A (144) by the encryption controller (145). In one embodiment, the encrypted transaction vectors (146) were encrypted with public keys and may be decrypted with the corresponding private key. The encrypted transaction vectors (146) are processed with the categorization process (150) to generate the encrypted category vectors (159).

The categorization process (150) is a collection of programs and components with instructions to process the encrypted transaction information (151) to generate the encrypted category information (154). The categorization process (150) uses the classifier controller (153) and the classifier models (152).

The encrypted transaction information (151) is data that includes the encrypted transaction vectors (146) generated by the encryption controller (145). The encrypted transaction information (151) may include encrypted transaction vectors for multiple different users from multiple different instances of the encryption process (140). For example, multiple instances of the encryption process (140) may be executing on multiple user devices that send encrypted transaction vectors to the categorization process (150).

The classifier models (152) are collections of programs with instructions that may operate as part of the categorization process (150). Each of the classifier models (152) is trained with data encrypted with a specific key. One of the encrypted transaction vectors (146) is encrypted with one of the keys A (144) and is processed by one of the classifier models (152) trained for the key. For example, a transaction vector (of the transaction vectors (143)) is encrypted with a public key (of the keys A (144)) and the resulting encrypted transaction vector (of the encrypted transaction vectors (146)) is processed with a classifier model (of the classifier models (152)) that was trained with data encrypted with the public key used to encrypt the original transaction vector. One of the classifier models (152) may correspond to one of the keys A (144). The classifier models (152) may include logistic regression models, neural network models, etc.

The classifier controller (153) is a collection of programs with instructions that may operate as part of the categorization process (150). The classifier controller (153) receives the encrypted transaction information (151), selects and applies the classifier models (152) to the encrypted transaction information (151) based on the keys used to encrypt the encrypted transaction information (151), and returns the encrypted category information (154). For example, the classifier controller (153) may receive an encrypted transaction vector (of the encrypted transaction vectors (146)), select a corresponding classifier model (from the classifier models (152)), and process the encrypted transaction vector with the selected classifier model to generate an encrypted category vector (of the encrypted category vectors (159)), which are part of the encrypted category information (154)).

The encrypted category information (154) is data that includes the encrypted category vectors (159) used by the decryption process (158). The encrypted category information (154) may include encrypted category vectors for multiple different users from multiple different instances of the decryption process (158). For example, multiple instances of the decryption process (158) may be executing on multiple user devices that receive encrypted category vectors from the categorization process (150).

The decryption process (158) is a collection of programs and components with instructions to process the encrypted category vectors (159) to generate the category identifiers (164). In one embodiment, the decryption process (158) uses the decryption controller (161), the decoder model (163), and the presentation controller (165).

The encrypted category vectors (159) are vectors that are effectively encrypted by the keys A (144) but were generated by one of the classifier models (152) from the encrypted transaction vectors (146). In one embodiment, the encrypted category vectors (159) may be decrypted with a private key (from the keys B (160)) that corresponds to the public key (from the keys A (144)) used to encrypt the encrypted transaction vectors (146). The encrypted category vectors (159) are input to the decryption controller (161).

The keys B (160) are cryptographic keys that are used to decode (i.e., decrypt) the encrypted category vectors (159). The keys B (160) may include private keys (used for decoding) that are paired with public keys (used for encoding).

The decryption controller (161) is a collection of programs with instructions that may operate as part of the decryption process (158). The decryption controller (161) processes the encrypted category vectors (159) with the keys B (160) to generate the category vectors (162). In one embodiment, the decryption controller (161) uses fully homomorphic decryption to generate the category vectors (162).

The category vectors (162) are vectors that identify categories for the corresponding transaction vectors (143). In one embodiment, a category vector (of the category vectors (162)) may include a set of floating-point values in the range from 0 to 1. In one embodiment, the dimensions of the category vector correspond to different categories, which may represent account names of a chart of accounts, and which may be assigned to a transaction record. The values in the dimensions of the category vector indicate the likelihood that the category (e.g., account name) associated with a particular dimension will be assigned to a transaction record. A higher value (e.g., closer to 1) in a dimension of a category vector indicates a higher likelihood that the corresponding transaction record will be assigned to the category represented by the dimension. The category vectors (162) are input to the decoder model (163).

The decoder model (163) is a collection of programs with instructions that may operate as part of the decryption process (158). The decoder model (163) processes the category vectors (162) to generate the category identifiers (164). The decoder model (163) may apply mappings and transforms to data from the category vectors (162) to generate the category identifiers (164). In one embodiment, the decoder model (163) may select the category identifier for the category that corresponds to the dimension of a category vector with the highest value.

The category identifiers (164) are data that identify categories. In one embodiment, each account of a chart of accounts corresponds to a category that is identified by a category identifier. In one embodiment, the category identifiers (164) are text values that include the name of an account. In one embodiment, the category identifiers (164) are numerical values that uniquely identify the accounts of a chart of accounts. One of the category identifiers (164) corresponds to one of the transaction records (141). The category identifiers (164) may be input to the presentation controller (165).

The presentation controller (165) is a collection of programs with instructions that may operate as part of the decryption process (158). In one embodiment, the presentation controller (165) generates and presents recommendations. In one embodiment, a recommendation is the name of the account that corresponds to one of the category vectors (162). The recommendation may be generated by mapping a category identifier to a text value that is injected into a message and displayed on a user interface.

Turning to FIG. 1B, the aggregation process (170), the clustering process (175), the key process (180), the training input process (185), and the training process (190) may operate to train the machine learning models (192) to perform private categorization using shared keys. The aggregation process (170), the clustering process (175), the key process (180), the training input process (185), and the training process (190) may operate to train the machine learning models (192) may execute on one or more of the user devices A (102) and B (107) through N (109) and the server (112) of FIG. 1C.

The aggregation process (170) is a collection of programs and components with instructions to process the historical data A (171) to generate the aggregated report data (173). The aggregation process (170) uses the report controller (172).

The historical data A (171) is data that is used to generate the cluster information (178). The historical data A (171) may be a subset of the historical information (127) of FIG. 1C. In one embodiment, the historical data A (171) includes historical transaction records. In one embodiment, the historical data A (171) may include recategorization data that tracks the manual recategorization of transaction records. The tracking for a recategorization may include a transaction identifier, a predicted category identifier, a selected category identifier, etc.

The report controller (172) is a collection of programs with instructions that may operate as part of the aggregation process (170). The report controller (172) processes the historical data A (171) to generate the aggregated report data (173). In one embodiment, the report controller (172) may aggregate multiple transaction records from the historical data A (171) using statistical methods.

The aggregated report data (173) is data that describes the transactions and categorizations from the historical data A (171). In one embodiment, the aggregated report data (173) may include distribution of categories, most common recategorizations, and recategorization rate. In one embodiment, the aggregated report data (173) may also include financial data, which may include average income amount, average expense amount, transaction location counts, etc. The aggregated report data (173) may be gathered periodically (e.g., every week, month, quarter, etc.) and sent to the clustering process (175). The aggregated report data (173) is sent to the clustering process (175) and forms a portion of the aggregated report information (176).

The clustering process (175) is a collection of programs and components with instructions to process the aggregated report information (176) to generate the cluster information (178). The clustering process (175) uses the cluster controller (177).

The aggregated report information (176) is data that includes the aggregated report data (173) generated by the report controller (172). The aggregated report information (176) may include aggregated data for multiple different users from multiple different instances of the aggregation process (170). For example, multiple instances of the aggregation process (170) may be executing on multiple user devices that send aggregated report data (including the aggregated report data (173)) to the clustering process (175) operating on a server.

The cluster controller (177) is a collection of programs with instructions that may operate as part of the clustering process (175). The cluster controller (177) processes the aggregated report information (176) to generate the cluster information (178). The cluster controller (177) applies a clustering algorithm to the aggregated report information (176). Clustering algorithms that may be used include DBSCAN, K-means, etc.

The cluster information (178) is a collection of cluster data (including the cluster data (181)). In one embodiment, for each user, the cluster controller (177) processes the aggregated report data for the user to generate a user cluster vector. The cluster controller (177) may then process the user cluster vectors with a clustering algorithm to identify clusters. A cluster within the cluster information (178) identifies a set of users that have similar information in their respective aggregated report data. A group cluster identifier may be a multidimensional variable the identifies the centroid of a cluster of users. Each user may be assigned a user cluster identifier that identifies the cluster to which a user belongs.

The key process (180) is a collection of programs and components with instructions to acquire the keys C (183) using the cluster data (181). The key process (180) uses the key controller (182). In one embodiment, the key process (180) may operate on user devices to prevent a server from being able to access private keys. In one embodiment, the key process (180) is performed on a server (which may be separate from a server that executes the training process (190)) that distributes the keys to the user devices.

The cluster data (181) may be a subset of the cluster information (178) for a single user. In one embodiment, the cluster data (181) includes a user cluster identifier The key controller (182) is a collection of programs with instructions that may operate as part of the key process (180). The key controller (182) processes the cluster data (181) to acquire the keys C (183). In one embodiment, a Diffie-Hellman key exchange may take place between the group of users of a cluster.

The keys C (183) are cryptographic keys. The keys C (183) may include public private key pairs for encrypting and decrypting data. The keys C (183) are shared between a group of users in the same cluster.

The training input process (185) is a collection of programs and components with instructions to process the historical data B (187) using the keys D (186) to generate the training data (189). The training input process (185) uses the training controller (188).

The keys D (186) are cryptographic keys. The keys D (186) are used to encrypt the historical data B (187). The keys D (186) may include keys for a specific user and may include group keys for groups of users in a cluster. Each encryption key of the keys D (186) may correspond to one of the machine learning models (192).

The historical data B (187) is data used to train the machine learning models (192). The historical data B (187) may be a subset of the historical information (127) (of FIG. 1C) that includes transaction records for training classifier models of the machine learning models (192).

The training controller (188) is a collection of programs with instructions that may operate as part of the training input process (185). The training controller (188) processes the historical data B (187) with the keys D (186) to generate the training data (189). In one embodiment, the training controller (188) may filter the historical information (127) to identify the historical data B (187).

The training data (189) is data used to training the machine learning models (192). The training data (189) is for one user and may form a portion of the training input (191).

The training process (190) is a collection of programs and components with instructions to process the training input (191) to train the machine learning models (192). The training process (190) uses the update controller (194).

The training input (191) is training data for one of the machine learning models (192). When training a model for a single user, the training input (191) may include the training data (189). When training a model for a group user (i.e., from a cluster), the training input (191) may include the training data (189) as well as additional training data from other users. The training input (191) is input to the machine learning models (192).

The machine learning models (192) include the models used by the system to private categorization using shared keys. In one embodiment, the machine learning models (192) may include the encoder model (142), the classifier models (152), and the decoder model (163) of FIG. 1A. One of the machine learning models (192) may be trained for each of the encryption keys for each user and for each group of users. The machine learning models (192) may include regression models, neural network models, etc. The machine learning models (192) process the training input (191) to generate the training output (193).

The training output (193) is the data generated by the machine learning models (192) from the training input (191). The training input (191) may be input to the update controller (194).

The update controller (194) is a collection of programs with instructions that may operate as part of the training process (190). The update controller (194) processes the training output (193) to generate the training updates (195) to improve the machine learning models (192). In one embodiment, the update controller (194) uses iterative algorithms, which may include regression, backpropagation, gradient descent, etc. In one embodiment, the update controller (194) compares the training output (193) to expected outputs and generates the training updates (195) responsive to the error between the training output (193) and the expected outputs.

The training updates (195) are updates for the machine learning models (192) generated based on the training output (193). In one embodiment, the training updates (195) include model parameters (e.g., weights) that are added to the existing weights of the machine learning models (192) to improve the machine learning models (192).

Turning to FIG. 1C, the system (100) performs private categorization using shared keys. In one embodiment, the system (100) executes the processes (140), (150), (158) of FIG. 1A and the processes (170), (175), (180), (185), and (190) of FIG. 1B using the user devices A (102) and B (107) through N (109) and the server (112) of FIG. 1C. The system (100) includes the server (112), the user devices A (102) and B (107) through N (109), and the repository (120).

Figure 4A:
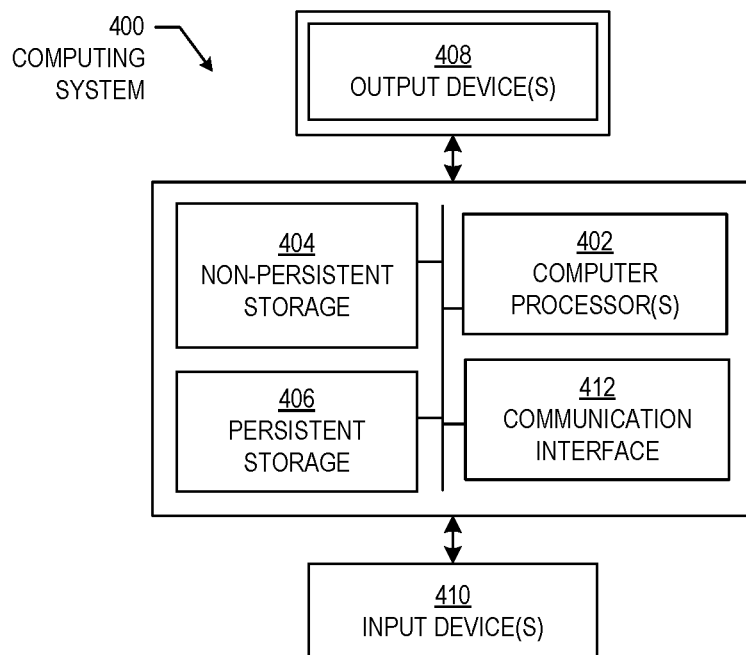
FIG. 4A and FIG. 4B show computing systems in accordance with disclosed embodiments.

The server (112) is a computing system (further described in FIG. 4A). The server (112) may include multiple physical and virtual computing systems that form part of a cloud computing environment. In one embodiment, execution of the instructions, programs, and applications of the server (112) is distributed to multiple physical and virtual computing systems in the cloud computing environment. The server (112) may include the server application (115).

The server application (115) is a collection of programs with instructions that may execute on multiple servers of a cloud environment, including the server (112). The server application (115) executes the processes (118). In one embodiment, the server application (115) hosts websites and may serve structured documents (hypertext markup language (HTML) pages, extensible markup language (XML) pages, JavaScript object notation (JSON) files and messages, etc.) to interact with the user devices A (102) and B (107) through N (109). Requests from the user devices A (102) and B (107) through N (109) may be processed to generate responses that are returned to the user devices A (102) and B (107) through N (109).

The processes (118) are a collection of programs and components with instructions to process the communications between the user devices A (102) and B (107) through N (109) and the server (112). The processes (118) may include one or more of the processes (140), (150), (158), (170), (175), (180), (185), and (190) of FIGS. 1A and 1B.

The user devices A (102) and B (107) through N (109) are computing systems (further described in FIG. 4A). For example, the user devices A (102) and B (107) through N (109) may be desktop computers, mobile devices, laptop computers, tablet computers, server computers, etc. The user devices A (102) and B (107) through N (109) include hardware components and software components that operate as part of the system (100). The user devices A (102) and B (107) through N (109) communicate with the server (112) to access, manipulate, and view services and information hosted by the system (100). In one embodiment, the user devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (102) and B (107) through N (109) respectively include the user applications A (105) and B (108) through N (110).

The user applications A (105) and B (108) through N (110) may each include multiple programs respectively running on the user devices A (102) and B (107) through N (109). The user applications A (105) and B (108) through N (110) may be native applications, web applications, embedded applications, etc. In one embodiment, the user applications A (105) and B (108) through N (110) may execute one or more of the processes (140), (150), (158), (170), (175), (180), (185), and (190) of FIGS. 1A and 1B. In one embodiment, the user applications A (105) and B (108) through N (110) include web browser programs that display web pages from the server (112).

As an example, the user application A (105) may be used to categorize transaction records by accessing the server (112). The user application A (105) sends a request to the server (112), which generates a response that identifies a transaction record and a predicted category for the transaction record. The user application A (105) may receive a user input to accept the predicted category or to recategorize the transaction record.

Figure 4B:
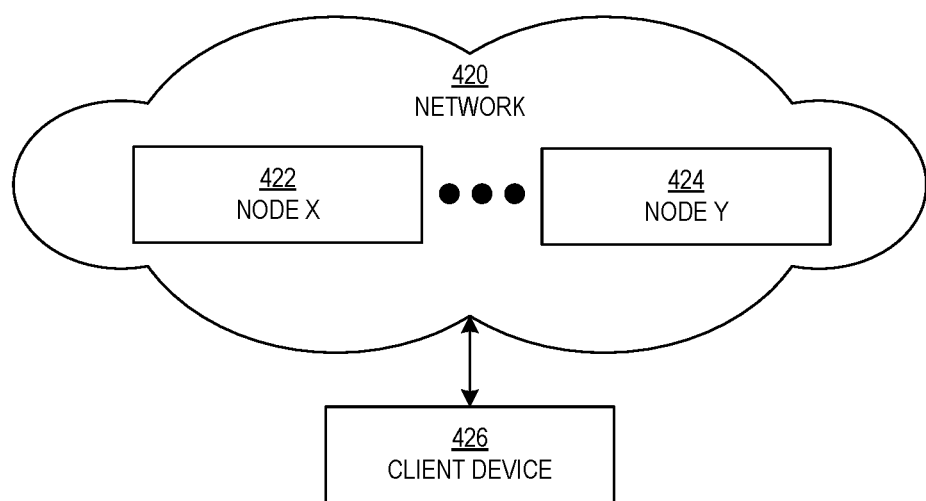

The repository (120) is a computing system that may include multiple computing devices in accordance with the computing system (400) and the nodes (422) and (424) described below in FIGS. 4A and 4B. The repository (120) may be hosted by a cloud services provider that also hosts the server (112). The cloud services provider may provide hosting, virtualization, and data storage services as well as other cloud services to operate and control the data, programs, and applications that store and retrieve data from the repository (120). The data in the repository (120) includes the transaction information (121), the key information (122), the aggregated report information (123), the cluster information (124), the training information (125), the model information (126), and the historical information (127).

The transaction information (121) is data that describes transactions of users of the system (100). The transaction information (121) may include transaction records for each user, including the transaction records (141) of FIG. 1A. In one embodiment, the transaction information (121) may be real time data the is processed upon performance of individual transactions and the storage of corresponding transaction records.

The key information (122) is data that defines the keys used by the system (100). The keys are encryption keys used to encrypt information in the system (100) to prevent unauthorized access to information. The key information (122) includes public keys paired with private keys. The pairs of keys include keys for individual users and keys for groups of users. The key information (122) may include the keys A (144), the keys B (160), the keys C (183), and the keys D (186).

The aggregated report information (123) is data that describes the users of the system (100). In one embodiment, the aggregated report information (123) includes summarizes of transaction records for each user of the system (100). The aggregated report information (123) is used as the basis for clustering the users into groups.

The cluster information (124) is data that identifies groups of users. the cluster information (124) includes the cluster data (181) of FIG. 1B. Cluster data may be generated for each user that identifies the cluster and group to which a user belongs. The cluster information (124) may include a cluster identifier for each user that identifies the cluster into which a user is grouped.

The training information (125) is data used to train the machine learning models of the system (100), including the machine learning models (192) of FIG. 1B. The training information (125) may include one or more of the historical data B (187), the training data (189), and the training input (191) of FIG. 1B. In one embodiment, the training information (125) includes the training input (191), which is encrypted to protect the underlying information (e.g., the historical data B (187)).

The model information (126) is data that defines the machine learning models of the system (100). The model information (126) includes data defining the machine learning models (192) of FIG. 1B The historical information (127) is data that describes the interactions of users with the system (100). In one embodiment, the historical information (127) includes transaction records, categorization records, and recategorization records. The transaction records describe the transactions of users, the categorization records describe the categories assigned to the transaction records, and the recategorization records describe changes to the categorization records. In one embodiment, the categorization records include the predicted categories generated by the system (100) for the transaction records, and the recategorization records may identify discrepancies between the predicted categories and manually selected categories.

Although shown using distributed computing architectures and systems, other architectures and systems may be used. In one embodiment, the server application (115) may be part of a monolithic application that implements the modeling and management of affinity networks. In one embodiment, the user applications A (105) and B (108) through N (110) may be part of monolithic applications that perform private categorization using shared keys without the server application (115).

Figure 2:
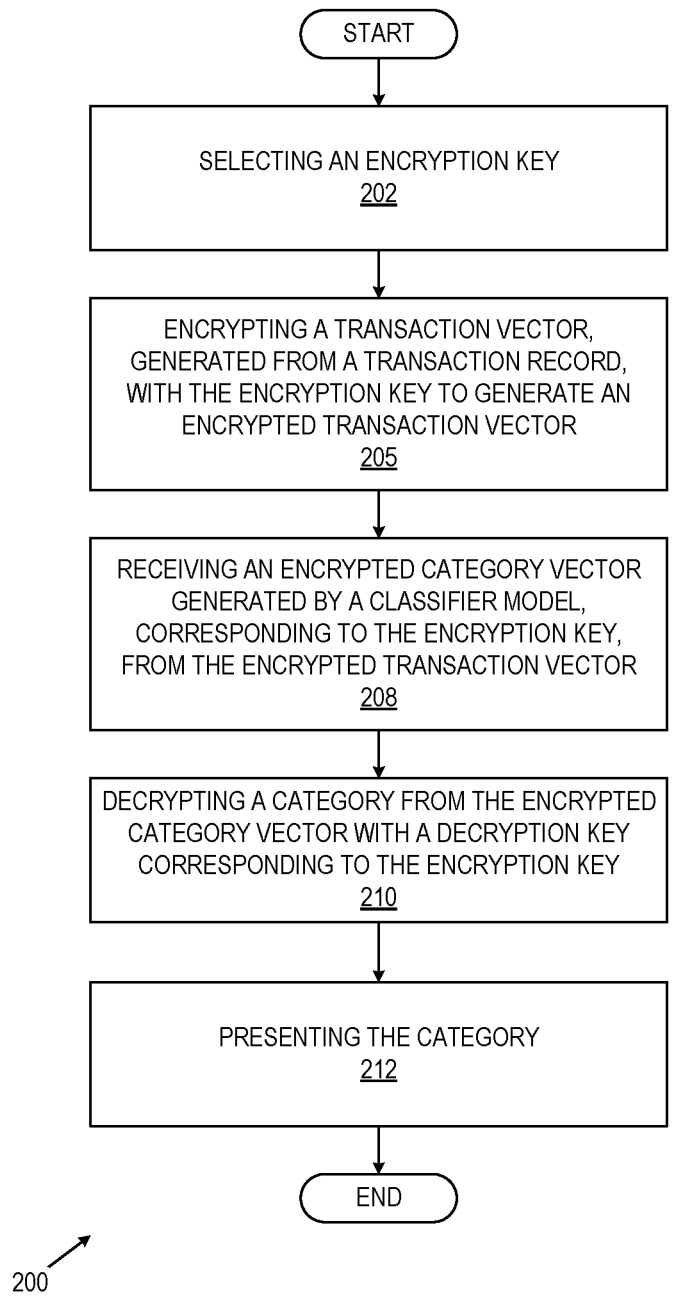
FIG. 2 shows a flowchart in accordance with disclosed embodiments.

Turning to FIG. 2, the process (200) performs private categorization using shared keys. The process (200) may be performed by a computing device interacting with one or more additional computing devices. For example, the process (200) may execute on a server response to one or more user devices.

At Step 202, an encryption key is selected. In one embodiment, the encryption key is one of a user key and a group key. In one embodiment, the group key corresponds to a group of user identifiers of a cluster of users. Cluster data maintained by the system maps between the user identifiers and cluster identifiers to identify the users that belong to specific clusters. In one embodiment, the cluster is generated using an aggregated report that includes historical transaction records. In one embodiment, an aggregated report may be a vector of statistical information generated from historical data.

In one embodiment, the encryption key is a group key that is distributed responsive to a user selection for joining the group of user identifiers of the cluster. The selection may be received from a user device. In one embodiment, the group key is generated and distributed in response to the user selection.

In one embodiment, the encryption key is a public key and the decryption key is a corresponding private key. The public key and the private key form a key pair. The public key may be used to encrypt or verify information and the private key may be used to decrypt or sign information.

In one embodiment, the cluster is generated by a cluster controller in response to receiving a multiple aggregated reports from multiple user processes on a periodic basis. The user processes may correspond to users of the system.

In one embodiment, the aggregated report may include statistical data, distribution data, re-categorization data, and financial data generated from multiple transaction records.

At Step 205, a transaction vector, generated from a transaction record, is encrypted with the encryption key to generate an encrypted transaction vector. In one embodiment, the encryption may be performed using an asymmetric cryptographic algorithm In one embodiment, the transaction record being encrypted is processed with an encoder model to generate the transaction vector. In one embodiment, the encoder model may include a neural network operating on numerical data or textual data, and the neural network may include an autoencoder, an embedding layer, a transformer network, an attention layer, etc. In one embodiment, the encoder model may be trained with historical data encrypted with an encryption key distributed to each user that is periodically updated.

In one embodiment, the transaction vector is encrypted using fully homomorphic encryption. Fully homomorphic encryption prevents the servers that process the data form access to personally identifiable information from the underlying transaction record.

At Step 208, an encrypted category vector is received that is generated by a classifier model from the encrypted transaction vector. The classifier model corresponds to the encryption key. A classifier model trained on data encrypted with one key may not work with data encrypted with a different key.

In one embodiment, the classifier model is one of a user classifier model and a group classifier model. In one embodiment, the user classifier model is trained on user transaction records corresponding to a user identifier of the group of user identifiers. In one embodiment, the group classifier model is trained on group transaction records corresponding to the group of user identifiers and including the user transaction records for the users of the group of a cluster.

At Step 210, a category from the encrypted category vector is decrypted with a decryption key corresponding to the encryption key. In one embodiment, the category is identified by decrypting the encrypted category vector to generate a category vector and processing the category vector with a decoder model. In one embodiment, the decoder model is a category decoder model. In one embodiment, the decoder model may be trained with historical data encrypted with a key distributed to each user and periodically updated. In one embodiment, the category identifies an account of a chart of accounts for a transaction record. A chart of accounts may include names for accounts. The names may include "accounts receivable", "accounts payable", "revenue", etc.

At Step 212, the category is presented. In one embodiment, the category may be presented by sending a message to a user device that includes the category. The user device may display the category in a user interface.

In one embodiment, the category is presented for an account of a chart of accounts. In one embodiment, an account for the category is updated to include the transaction record in response to a user selection.

Figure 3:
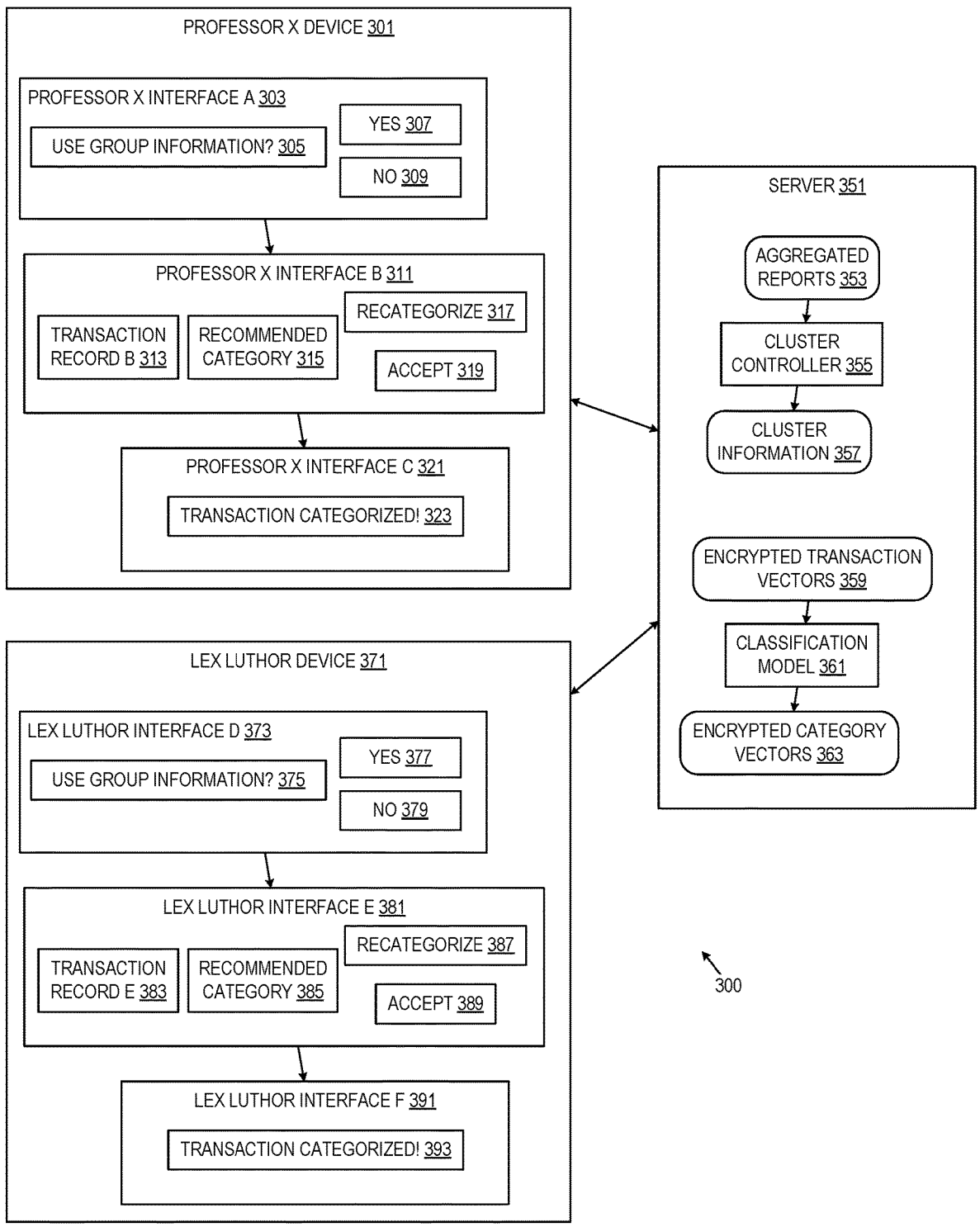
FIG. 3 shows examples in accordance with disclosed embodiments.

Turning to FIG. 3, the system (300) performs private categorization using shared keys. In their quests to avoid getting audited, Professor X and Lex Luthor each seek to categorize their transactions using the system (300). Professor X operates the Professor X Device (301), and Lex Luthor operates the Lex Luthor device (371).

The Professor X Device (301) is a computing device that may be a smartphone, desktop computer, tablet computer, etc. The Professor X Device (301) displays the Professor X interfaces A (303), B (311), and C (321).

The Professor X interface A (303) is displayed on the Professor X Device (301) after an aggregated report (one of the aggregated reports (353)) is sent to the server (351) and is used to generate the cluster information (357) to identify a cluster of users with transactions and categories that are similar to those for Professor X.

The text (305) along with the yes element (307) and the no element (309) are displayed in the Professor X interface A (303). The text (305) is displayed to indicate that Professor X may use models trained with transaction records for groups of users to provide more accurate categorizations. Since Professor X fears getting audited more than any supervillain, Professor X readily accepts by selecting the yes element (307) and will use group models. Had the no element (309) been selected, a user specific model trained on Professor X's data (without group data) would have been used.

The Professor X interface B (311) is displayed after Professor X has selected to categorize the transaction record B (313). The transaction record B (313) is displayed along with the recommended category (315). The recommended category (315) was identified by the classification model (361) after the transaction record B (313) is processed. The transaction record B (313) is processed by extracting a transaction vector from the transaction record B (313), encrypting the transaction vector with the group encryption key on the Professor X Device (301) to form an encrypted transaction vector, and transmitting the encrypted transaction vector (part of the encrypted transaction vectors (359)) to the server (351). The server (351) processes the encrypted transaction vector with the classification model (361) to generate an encrypted category vector that is returned to the Professor X Device (301). The Professor X Device (301) decrypts the encrypted category vector and selects the recommended category (315) as the category identified by the category vector.

Professor X may recategorize the transaction record B (313) by selecting the recategorize element (317) or accept the recommended category (315) by selecting the accept element (319). Selection of the recategorize element (317) may bring up a window that allows Professor X to specify the category for the transaction record B (313).

The Professor X interface C (321) is displayed after interaction with the Professor X interface B (311). The Professor X interface C (321) provides the text (323) to indicate that the transaction was successfully categorized by selection of either the recategorize element (317) or the accept element (319).

The server (351) is a computing device. The server (351) may be used to train and use machine learning models to generate predictions of categories for transaction records. The server (351) may train models for specific users and for groups of users. Data for the models may obfuscated or encrypted to prevent the server (351) from accessing the underlying data.

The aggregated reports (353) are received from each of the users of the system (300). The aggregated reports (353) include aggregated reports from the Professor X Device (301) and from the Lex Luthor device (371).

The cluster controller (355) processes the aggregated reports (353) to cluster the users of the system and generate the cluster information (357). In one embodiment, the cluster controller (355) may use K-means clustering.

The cluster information (357) maps users to groups of users. Each user may acquire a set of user encryption keys to use user specific models. Each group of users may acquire a set of group encryption keys to use group specific models.

The encrypted transaction vectors (359) are received from the users of the system (300). The encrypted transaction vectors (359) include encrypted transaction vectors for the transaction record B (313) from the Professor X Device (301) and the transaction record E (383) from the Lex Luthor device (371).

The classification model (361) is a group model that processes the encrypted transaction vectors (359) that have been encrypted with the same group encryption key. The classification model (361) processes the encrypted transaction vectors (359) to generate the encrypted category vector (363).

The encrypted category vector (363) is generated from the encrypted transaction vectors (359) by the classification model (361). The encrypted category vector (363) includes encrypted category vectors for the recommended category (315) of the Professor X Device (301) and the recommended category (385) of the Lex Luthor device (371).

The Lex Luthor device (371) is a computing device that may be a smartphone, desktop computer, tablet computer, etc. The Lex Luthor device (371) and its components operate in a similar fashion as those of the Professor X Device (301).

The Lex Luthor interface D (373) displays the text (375) and receives user input for the selection of one of the yes element (377) and the no element (379). In an ironic twist, Lex Luthor fears getting audited as much as any superhero and also selects the yes element (377) to use a group model.

The Lex Luthor interface E (381) displays the transaction record E (383) which has been processed by the Lex Luthor device (371) and the server (351) to generate the recommended category (385), which may be the same as the recommended category (315) that was recommended for Professor X. The recategorize element (387) and the accept element (389) are displayed and Lex Luthor selects the accept element (389) to accept the the recommended category (385) for the transaction record E (383).

The Lex Luthor interface F (391) is displayed with the text (393). The text (393) indicates that the transaction record E (383) was successfully categorized.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 4A, the computing system (400) may include one or more computer processors (402), non-persistent storage (404), persistent storage (406), a communication interface (412) (e.g., Bluetooth interface, infrared interface, network interface, optical interface, etc.), and numerous other elements and functionalities that implement the features and elements of the disclosure. The computer processor(s) (402) may be an integrated circuit for processing instructions. The computer processor(s) may be one or more cores or micro-cores of a processor. The computer processor(s) (402) includes one or more processors. The one or more processors may include a central processing unit (CPU), a graphics processing unit (GPU), a tensor processing unit (TPU), combinations thereof, etc.

The input device(s) (410) may include a touchscreen, keyboard, mouse, microphone, touchpad, electronic pen, or any other type of input device. The input device(s) (410) may receive inputs from a user that are responsive to data and messages presented by the output device(s) (408). The inputs may include text input, audio input, video input, etc., which may be processed and transmitted by the computing system (400) in accordance with the disclosure. The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the output device(s) (408) may include a display device, a printer, external storage, or any other output device. One or more of the output devices may be the same or different from the input device(s). The input and output device(s) may be locally or remotely connected to the computer processor(s) (402). Many different types of computing systems exist, and the aforementioned input and output device(s) may take other forms. The output device(s) (408) may display data and messages that are transmitted and received by the computing system (400). The data and messages may include text, audio, video, etc., and include the data and messages described above in the other figures of the disclosure.

Software instructions in the form of computer readable program code to perform embodiments may be stored, in whole or in part, temporarily or permanently, on a computer program product that includes a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

The nodes (e.g., node X (422), node Y (424)) in the network (420) may be configured to provide services for a client device (426), including receiving requests and transmitting responses to the client device (426). For example, the nodes may be part of a cloud computing system. The client device (426) may be a computing system, such as the computing system shown in FIG. 4A. Further, the client device (426) may include and/or perform all or a portion of one or more embodiments of the invention.

The computing system of FIG. 4A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. A method comprising:
   clustering a plurality of user devices into a plurality of groups of user devices, wherein each of the plurality of groups of user devices are assigned to use a corresponding group specific model in a plurality of group specific models;
   transmitting a plurality of user encryption keys to use the group specific models to the plurality of user devices, wherein each user receives a corresponding user encryption key for a corresponding group specific model assigned to the each user;
   receiving a plurality of encrypted transaction vectors from a plurality of user devices, wherein a corresponding encrypted transaction vector in the plurality of encrypted transaction vectors is encrypted using a corresponding group encryption key in the plurality of user encryption keys;
   assigning the plurality of encrypted transaction vectors to ones of the group specific models such that any one group specific model is assigned those of the plurality of encrypted transaction vectors that share a common corresponding user encryption key in the plurality of user encryption keys;
   generating, using the plurality of group specific models, a plurality of encrypted category vectors from the plurality of encrypted transaction vectors, wherein each of the plurality of encrypted category vectors comprises a corresponding encrypted recommended category for a corresponding encrypted transaction vector in the plurality of encrypted transaction vectors, and wherein each of the encrypted category vectors is generated by a corresponding one of the plurality of group specific models; and
   transmitting the plurality of encrypted category vectors to the plurality of user devices for decryption by the plurality of user devices using a plurality of decryption keys corresponding to the plurality of user encryption keys.

2. The method of claim 1, further comprising:
   distributing the plurality of group keys responsive to a user selection for joining a group of user identifiers for the corresponding group specific model.

3. The method of claim 1,
wherein the plurality of user encryption keys comprise public keys and the plurality of decryption keys comprise corresponding private keys.

4. The method of claim 1,
wherein clustering is generated by a cluster controller in response to receiving a plurality of aggregated reports from a plurality of user processes on a periodic basis.

5. The method of claim 4,
wherein the plurality of aggregated reports comprises one or more of statistical data, distribution data, re-categorization data, and financial data generated from a plurality of transaction records.

6. The method of claim 1,
wherein the plurality of encrypted transaction vectors are encrypted using fully homomorphic encryption.

7. The method of claim 1,
wherein the plurality of group specific models comprise a plurality of group classifier models; and
wherein the plurality of group classifier models are trained on group transaction records corresponding to the plurality of groups of user devices and comprising user transaction records.

8. The method of claim 1, further comprising:
receiving a plurality of user selections of classifications for the plurality of encrypted transaction vectors;
updating a plurality of accounts for the plurality of user devices based on the plurality of user selections of classifications.

9. A system comprising:
at least one processor; and
at least one memory storing program code which, when executed by the processor, performs a computer-implemented method comprising:
clustering a plurality of user devices into a plurality of groups of user devices, wherein each of the plurality of groups of user devices are assigned to use a corresponding group specific model in a plurality of group specific models;
transmitting a plurality of user encryption keys to use the group specific models to the plurality of user devices, wherein each user receives a corresponding user encryption key for a corresponding group specific model assigned to the each user;
receiving a plurality of encrypted transaction vectors from a plurality of user devices, wherein a corresponding encrypted transaction vector in the plurality of encrypted transaction vectors is encrypted using a corresponding group encryption key in the plurality of user encryption keys;
assigning the plurality of encrypted transaction vectors to ones of the group specific models such that any one group specific model is assigned those of the plurality of encrypted transaction vectors that share a common corresponding user encryption key in the plurality of user encryption keys;
generating, using the plurality of group specific models, a plurality of encrypted category vectors from the plurality of encrypted transaction vectors, wherein each of the plurality of encrypted category vectors comprises a corresponding encrypted recommended category for a corresponding encrypted transaction vector in the plurality of encrypted category vectors, and wherein each of the encrypted category vectors is generated by a corresponding one of the plurality of group specific models; and
transmitting the plurality of encrypted category vectors to the plurality of user devices for decryption by the plurality of user devices using a plurality of decryption keys corresponding to the plurality of user encryption keys.

10. The system of claim 9, wherein the computer-implemented method further comprises:
distributing the plurality of group keys responsive to a user selection for joining a group of user identifiers for the corresponding group specific model.

11. The system of claim 9, wherein the plurality of user encryption keys comprise public keys and the plurality of decryption keys comprise corresponding private keys.

12. The system of claim 9, wherein, in the computer-implemented method, clustering is generated by a cluster controller in response to receiving a plurality of aggregated reports from a plurality of user processes on a periodic basis.

13. The system of claim 12, wherein the plurality of aggregated reports comprises one or more of statistical data, distribution data, re-categorization data, and financial data generated from a plurality of transaction records.

14. The system of claim 9, wherein the plurality of encrypted transaction vectors are encrypted using fully homomorphic encryption.

15. The system of claim 9, wherein the plurality of group specific models comprise a plurality of group classifier models; and
wherein the plurality of group classifier models are trained on group transaction records corresponding to the plurality of groups of user devices and comprising user transaction records.

16. The system of claim 9, wherein the computer-implemented method further comprises:
receiving a plurality of user selections of classifications for the plurality of encrypted transaction vectors; and
updating a plurality of accounts for the plurality of user devices based on the plurality of user selections of classifications.

17. A non-transitory computer readable storage medium storing program code which, when executed by a processor, performs a computer-implemented method comprising:
clustering a plurality of user devices into a plurality of groups of user devices, wherein each of the plurality of groups of user devices are assigned to use a corresponding group specific model in a plurality of group specific models;
transmitting a plurality of user encryption keys to use the group specific models to the plurality of user devices, wherein each user receives a corresponding user encryption key for a corresponding group specific model assigned to the each user;
receiving a plurality of encrypted transaction vectors from a plurality of user devices, wherein a corresponding encrypted transaction vector in the plurality of encrypted transaction vectors is encrypted using a corresponding group encryption key in the plurality of user encryption keys;
assigning the plurality of encrypted transaction vectors to ones of the group specific models such that any one group specific model is assigned those of the plurality of encrypted transaction vectors that share a common corresponding user encryption key in the plurality of user encryption keys;
generating, using the plurality of group specific models, a plurality of encrypted category vectors from the plurality of encrypted transaction vectors, wherein each of the plurality of encrypted category vectors comprises a corresponding encrypted recommended category for a corresponding encrypted transaction vector in the plurality of encrypted transaction vectors, and wherein each of the encrypted category vectors is generated by a corresponding one of the plurality of group specific models; and transmitting the plurality of encrypted category vectors to the plurality of user devices for decryption by the plurality of user devices using a plurality of decryption keys corresponding to the plurality of user encryption keys.

18. The non-transitory computer readable storage medium of claim 17, wherein the computer-implemented method further comprises:

distributing the plurality of group keys responsive to a user selection for joining a group of user identifiers for the corresponding group specific model.

19. The non-transitory computer readable storage medium of claim 17, wherein the plurality of user encryption keys comprise public keys and the plurality of decryption keys comprise corresponding private keys.

20. The non-transitory computer readable storage medium of claim 17, wherein, in the computer-implemented method, clustering is generated by a cluster controller in response to receiving a plurality of aggregated reports from a plurality of user processes on a periodic basis.

* * * * *